United States Patent
Goto

(10) Patent No.: US 9,447,812 B2
(45) Date of Patent: Sep. 20, 2016

(54) APPARATUS TO ASSIST MOUNTING A BICYCLE COMPONENT

(75) Inventor: Masashi Goto, Sakai (JP)

(73) Assignee: Shimano, Inc., Sakai, Osaka (JP)

( * ) Notice: Subject to any disclaimer, the term of this patent is extended or adjusted under 35 U.S.C. 154(b) by 59 days.

(21) Appl. No.: 13/150,492

(22) Filed: Jun. 1, 2011

(65) Prior Publication Data

US 2012/0308327 A1  Dec. 6, 2012

(51) Int. Cl.
| | |
|---|---|
| *F16B 27/00* | (2006.01) |
| *F16B 39/32* | (2006.01) |
| *B62K 19/38* | (2006.01) |
| *F16B 39/24* | (2006.01) |
| *F16D 65/02* | (2006.01) |

(52) U.S. Cl.
CPC .............. *F16B 39/32* (2013.01); *B62K 19/38* (2013.01); *F16B 39/24* (2013.01); *F16D 2065/1396* (2013.01)

(58) Field of Classification Search
CPC .......... B62K 19/38; B62L 1/00; B62L 1/02; F16B 39/282; F16B 39/24; F16B 39/32
USPC ....... 411/84, 98, 101, 125, 128, 978, 88–90, 411/963
See application file for complete search history.

(56) References Cited

U.S. PATENT DOCUMENTS

| | | | | |
|---|---|---|---|---|
| 253,638 | A * | 2/1882 | Smith .............................. | 411/89 |
| 268,079 | A | 11/1882 | Carter | |
| 333,155 | A * | 12/1885 | Procter ......................... | 411/145 |
| 376,771 | A * | 1/1888 | Fuller .................... | F16B 37/14 |
| | | | | 411/89 |
| 442,970 | A * | 12/1890 | Gissinger .............. | F16B 39/101 |
| | | | | 411/98 |
| 474,380 | A * | 5/1892 | Garrett ......................... | 411/101 |
| 492,722 | A * | 2/1893 | Gibson .......................... | 411/89 |
| 543,695 | A * | 7/1895 | Leroux ......................... | 411/101 |
| 571,721 | A * | 11/1896 | Cunningham ................ | 411/145 |
| 674,302 | A * | 5/1901 | Moore .......................... | 411/127 |
| 689,173 | A * | 12/1901 | Everett et al. ................ | 411/128 |
| 695,489 | A * | 3/1902 | Pruden ......................... | 411/101 |
| 749,924 | A * | 1/1904 | Duijn ..................... | F16B 39/24 |
| | | | | 411/126 |
| 1,159,360 | A * | 11/1915 | Clauss ........................... | 30/270 |
| 1,183,619 | A * | 5/1916 | Barringer ....................... | 411/89 |
| 1,480,318 | A * | 1/1924 | Valade ......................... | 411/132 |
| 1,708,305 | A * | 4/1929 | Flowers ........................ | 411/197 |
| 1,733,858 | A * | 10/1929 | Brandt ................... | E01B 11/38 |
| | | | | 411/98 |
| 1,893,114 | A * | 1/1933 | Tice ............................. | 411/126 |

(Continued)

FOREIGN PATENT DOCUMENTS

CN  2102403 U  4/1992

*Primary Examiner* — Gary Estremsky
(74) *Attorney, Agent, or Firm* — James A. Deland

(57) ABSTRACT

A locking member has a first surface, a first mounting opening and a second mounting opening. Each first mounting opening and second mounting opening is dimensioned to receive the shank portion of a corresponding rotatable member therethrough so that a bottom surface of a head portion of the rotatable member faces toward the first surface of the locking member. A first extending member extends elastically relative to the first surface, wherein the first extending member is disposed in close proximity to the first mounting opening. When the rotatable member is in a mounting position in the first mounting opening, the first extending member contacts the head portion of the rotatable member to inhibit the rotatable member from rotating in a first direction, and the first extending member deflects elastically when the rotatable member rotates in a second direction opposite the first direction.

17 Claims, 6 Drawing Sheets

(56) References Cited

U.S. PATENT DOCUMENTS

| | | | |
|---|---|---|---|
| 1,894,631 A * | 1/1933 | Owen | 411/144 |
| 2,013,526 A * | 9/1935 | Schmitt | F16B 39/24 |
| | | | 411/198 |
| 2,128,429 A * | 8/1938 | Olson | 411/123 |
| 2,141,701 A * | 12/1938 | Uherkovich | F16B 39/24 |
| | | | 411/245 |
| 2,423,918 A * | 7/1947 | Wohlhieter | 411/97 |
| 2,518,399 A * | 8/1950 | Thompson | 411/163 |
| 2,965,146 A * | 12/1960 | Cox | 411/134 |
| 3,275,055 A * | 9/1966 | Gutshall | 411/134 |
| 3,352,344 A * | 11/1967 | Lanius, Jr. | 411/145 |
| 3,385,341 A * | 5/1968 | Garstkiewicz | 411/134 |
| 3,419,057 A * | 12/1968 | Hogan | F16B 39/32 |
| | | | 411/125 |
| 3,804,140 A | 4/1974 | Harper | |
| 4,050,494 A * | 9/1977 | de Claire | 411/119 |
| 4,055,208 A * | 10/1977 | Blaul | 411/134 |
| 4,267,870 A | 5/1981 | Warner | |
| 4,283,091 A * | 8/1981 | Enders | 301/35.622 |
| 5,562,378 A * | 10/1996 | Blechschmidt et al. | F16B 33/008 |
| | | | 411/121 |
| 6,450,746 B1 * | 9/2002 | Kirimoto | 411/95 |
| 6,974,275 B2 | 12/2005 | Nago et al. | |
| 7,484,440 B2 * | 2/2009 | Wright | 81/121.1 |
| 2006/0083600 A1 * | 4/2006 | Zhao et al. | 411/161 |

* cited by examiner

APPARATUS TO ASSIST MOUNTING A BICYCLE COMPONENT

BACKGROUND OF THE INVENTION

The present invention is directed to bicycle components and, more particularly, to an apparatus to assist mounting a bicycle component.

Some bicycle components are designed to be mounted together using a fastener such as a bolt. Of course, it is desirable to prevent the fastener from undesirably loosening over time. To accomplish this goal, U.S. Pat. No. 4,267,870 discloses the use of a locking plate with two openings, wherein each opening receives a hex-head fastener therethrough. Locking tabs at opposite ends of the locking plate are bent upwardly to contact flat surfaces of the fastener head and thereby inhibit the fastener from rotating in the loosening direction. U.S. Pat. No. 6,974,275 discloses the use of a locking plate with two openings, wherein each opening receives a triangular-head fastener therethrough. Upwardly extending arcuate portions of the locking plate are bent radially inwardly and flattened to contact corresponding flat sides of the fastener head and thereby inhibit the fastener from rotating in the loosening direction.

SUMMARY OF THE INVENTION

The present invention is directed to various features of an apparatus to assist mounting a bicycle component. In one embodiment, a locking member has a first surface, a first mounting opening and a second mounting opening. Each first mounting opening and second mounting opening is dimensioned to receive the shank portion of a corresponding rotatable member therethrough so that a bottom surface of a head portion of the rotatable member faces toward the first surface of the locking member. A first extending member extends elastically relative to the first surface, wherein the first extending member is disposed in close proximity to the first mounting opening. When the rotatable member is in a mounting position in the first mounting opening, the first extending member contacts the head portion of the rotatable member to inhibit the rotatable member from rotating in a first direction, and the first extending member deflects elastically when the rotatable member rotates in a second direction opposite the first direction.

In another embodiment, a rotatable member has a head portion attached to a shank portion for extending into a bicycle component. A locking member has a first surface, a first mounting opening and a second mounting opening. Each first mounting opening and second mounting opening is dimensioned to receive the shank portion of a corresponding rotatable member therethrough so that a bottom surface of a head portion of the rotatable member faces toward the first surface of the locking member. A first extending member extends elastically relative to the first surface of the locking member, wherein the first extending member is disposed in close proximity to the first mounting opening. The first extending member contacts the head portion of the rotatable member to inhibit the rotatable member from rotating in a first direction, and the first extending member deflects elastically when the rotatable member rotates in a second direction opposite the first direction.

Additional inventive features will become apparent from the description below, and such features alone or in combination with the above features and their equivalents may form the basis of further inventions as recited in the claims.

DETAILED DESCRIPTION OF THE EMBODIMENTS

Figure 1:
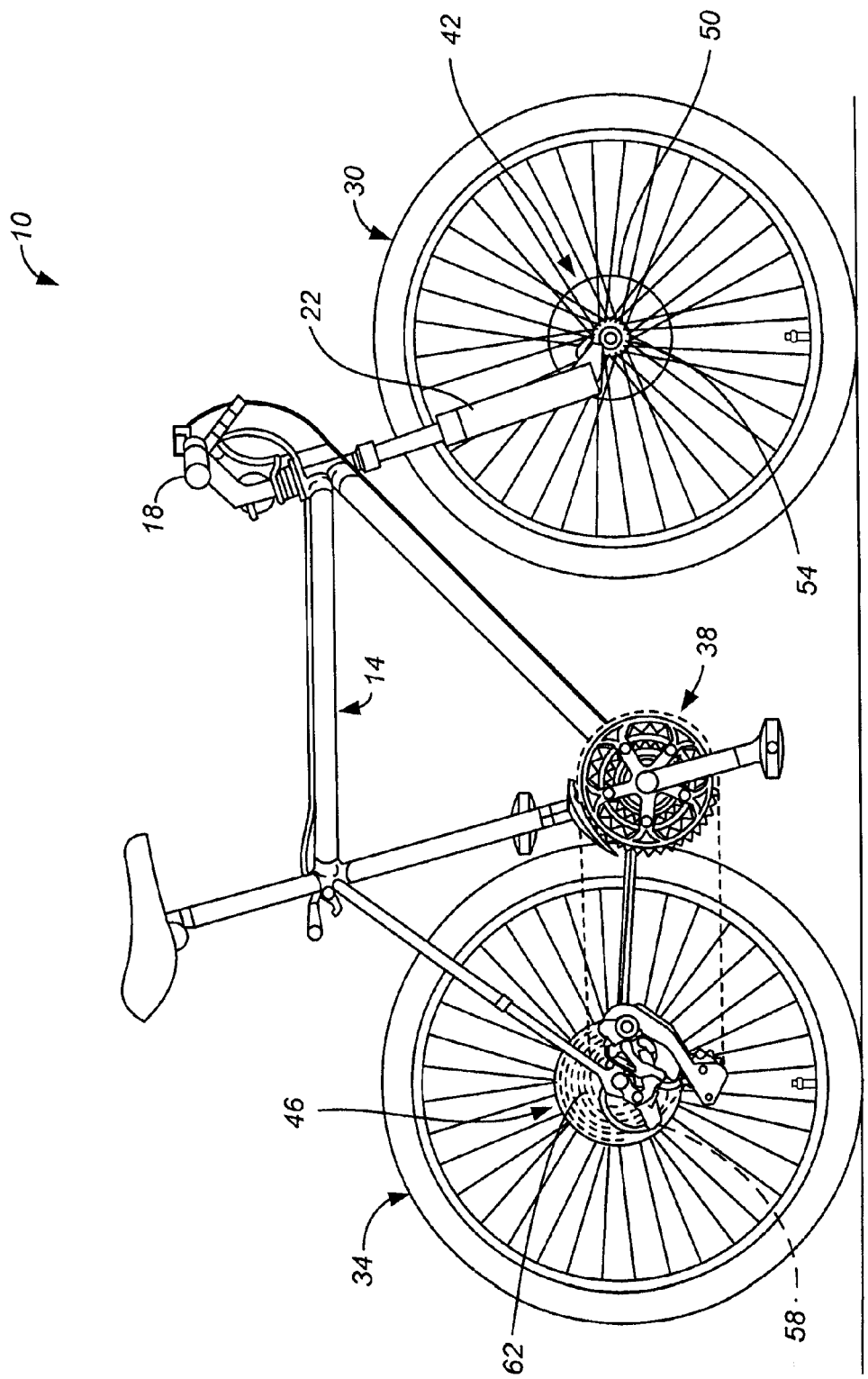
FIG. 1 is a side view of a particular embodiment of a bicycle.

FIG. 1 is a side view of a particular embodiment of a bicycle 10. In this embodiment, bicycle 10 is a mountain bicycle including a diamond-shaped frame 14, a handle bar 18, a front fork 22, front and rear wheels 30 and 34, and a drive train 38. Front and rear disk brake assemblies 42 and 46 operate in a conventional manner to apply braking forces to front and rear wheels 30 and 34, respectively. Front disk brake assembly 42 includes a front disk brake rotor 50 mounted to a front hub 54 of front wheel 30, and rear disk brake assembly 46 includes a rear disk brake rotor 58 mounted to a rear hub 62 of rear wheel 34. Other control components of front and rear disk brake assemblies 42 and 46 are not important to this disclosure and will not be shown or described in further detail. Furthermore, the relevant components of front and rear disk brake assemblies 42 and 46 are substantially the same, so only the relevant components of front disk brake assembly 42 will be described in detail.

Figure 2:
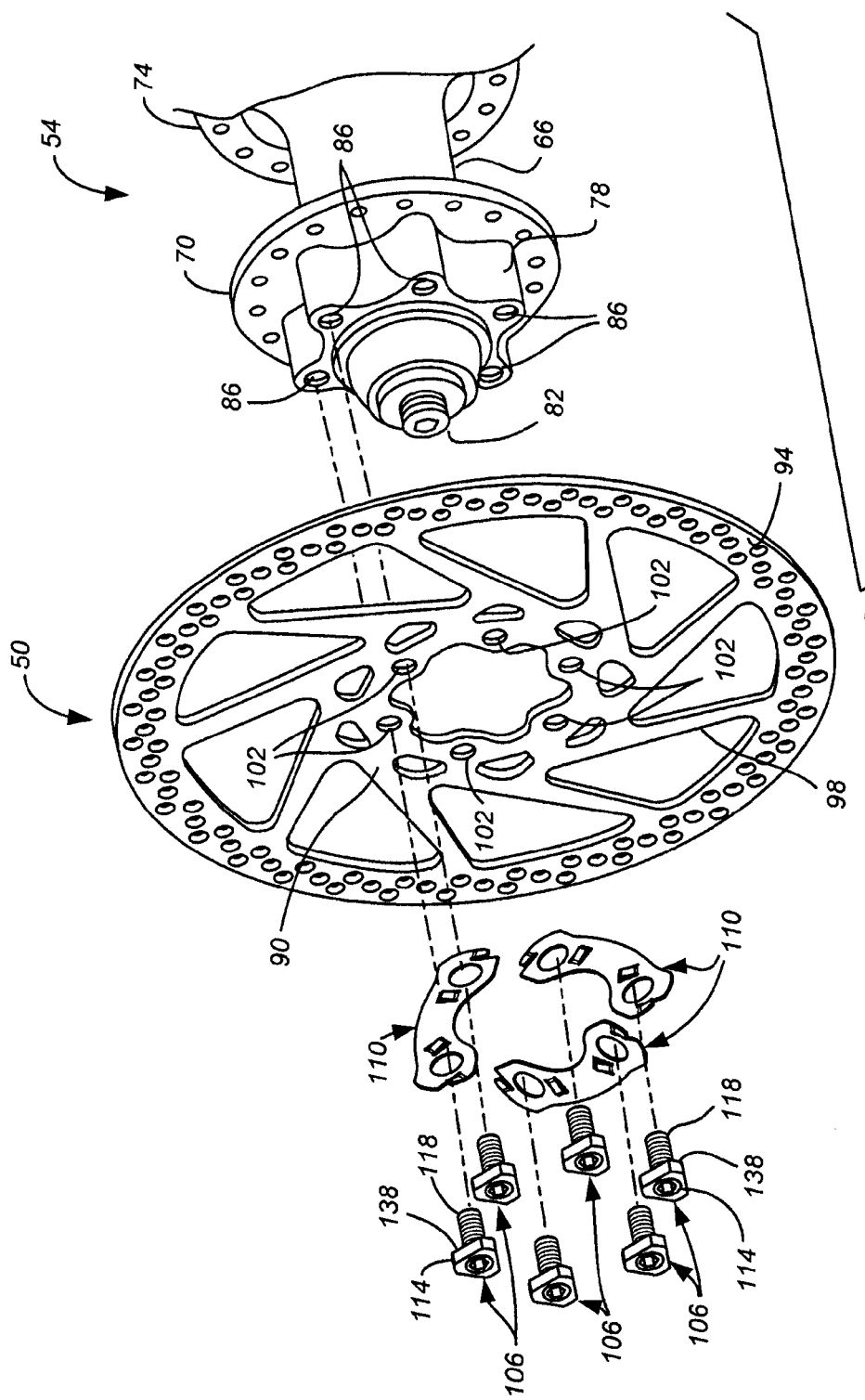
FIG. 2 is an exploded perspective view of particular embodiments of components used to attach a disk brake rotor to a bicycle hub.

As shown in FIG. 2, front hub 54 comprises a hub body 66 with a pair of conventional spoke mounting flanges 70 and 74 and a disk mounting portion 78. Hub body 66 is rotatably mounted around an axle 82 in a conventional manner. A plurality of threaded openings 86 are formed in the axial end face of disk mounting portion 78 and are circumferentially spaced apart from each other.

Front disk brake rotor 50 comprises an inner annular portion 90 and an outer annular portion 94 connected together by a plurality of radially extending connecting arms 98. Inner annular portion 90 includes a plurality of mounting openings 102 that align with threaded openings 86 in disk mounting portion 78 of front hub 54 when front disk brake rotor 50 is mounted to front hub 54.

Figure 4:
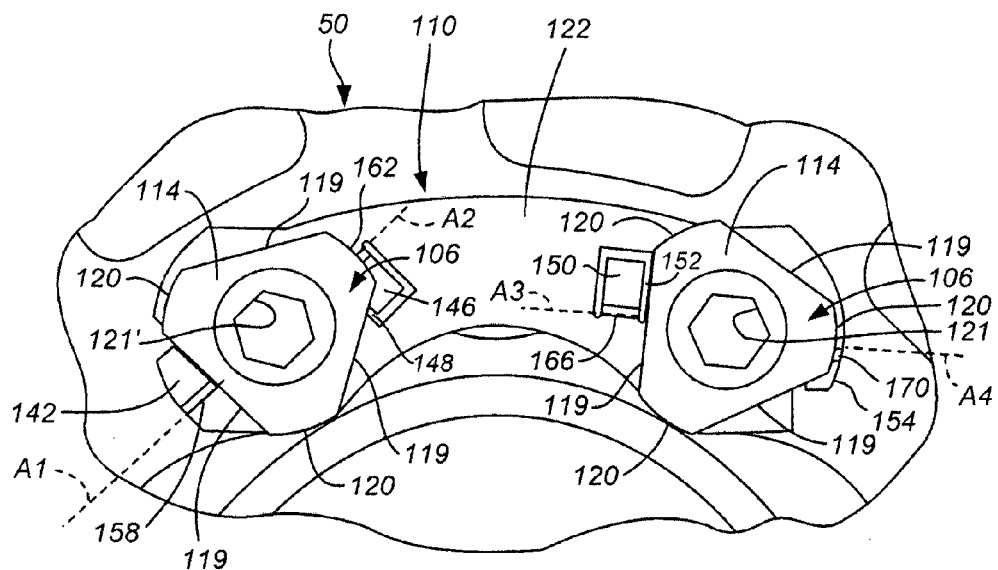
FIG. 4 is a front view of the locking member and a rotatable member in a mounting position.

In the assembled state, front disk brake rotor 50 is fixedly coupled to disk mounting portion 78 of front hub 54 by a plurality of rotatable members 106 and a plurality of locking members 110. In this embodiment, each rotatable member 106 is formed as a bolt having a head portion 114 and a threaded shank portion 118. As shown in FIG. 4, head portion 114 of each rotatable member 106 has a generally triangular shape with flat portions 119 and curved portions 120. Head portion 114 of each rotatable member 106 further includes a tool-engaging opening 121 in the form of a star-shaped recess.

Figure 3:
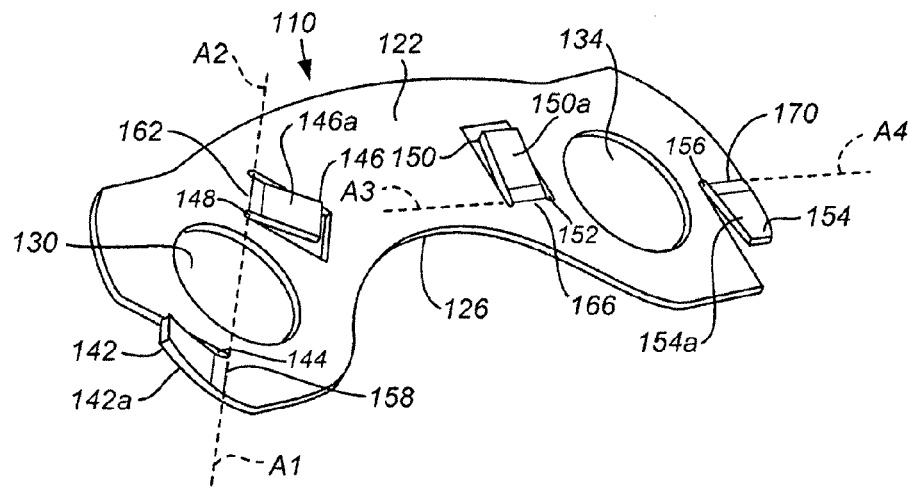
FIG. 3 is an upper perspective view of a locking member.

As shown in FIG. 3, each locking member 110 may comprise a substantially flat thin metal plate that may be manufactured as a continuous one-piece member by stamping or by any other suitable manufacturing technique. More specifically, in this embodiment locking member 110 includes an upper first surface 122, a lower second surface 126 opposite first surface 122, a first mounting opening 130 and a second mounting opening 134, wherein first mounting opening 130 and second mounting opening 134 are dimensioned and positioned to align with a corresponding pair of threaded openings 86 in disk mounting portion 78 of front hub 54. Each first mounting opening 130 and second mounting opening 134 is dimensioned to receive shank portion 118 of a corresponding rotatable member 106 therethrough so that a bottom surface 138 (FIG. 2) of head portion 114 of rotatable member 106 faces toward first surface 122. Locking member 110 may have a substantially uniform thickness of less than about 0.5 millimeters, and preferably about 0.25 millimeters.

Panel-shaped upwardly extending members 142 and 146 extend elastically upwardly at an incline from first surface 122 of locking member 110 in close proximity to first mounting opening 130 so that first mounting opening 130 is disposed between upwardly extending members 142 and 146. Similarly, panel-shaped upwardly extending members 150 and 154 extend elastically upwardly at an incline from first surface 122 in close proximity to second mounting opening 134 so that second mounting opening 134 is disposed between upwardly extending members 150 and 154. An open-space clearance 144 is formed in locking member 110 between first mounting opening 130 and upwardly extending member 142, an open-space clearance 148 is formed in locking member 110 between first mounting opening 130 and upwardly extending member 146, an open-space clearance 152 is formed in locking member 110 between second mounting opening 134 and upwardly extending member 150, and an open-space clearance 156 is formed in locking member 110 between second mounting opening 134 and upwardly extending member 154. In this embodiment, junctions 158 and 162 between first surface 122 of locking member 110 and upwardly extending members 142 and 146 extend along respective axes A1 and A2 that extend radially outwardly from a location in first opening 130 (e.g., from the center) along first surface 122. Similarly, junctions 166 and 170 between first surface 122 of locking member 110 and upwardly extending members 150 and 154 extend along respective axes A3 and A4 that extend radially outwardly from a location in second opening 134 (e.g., from the center) along first surface 122. As a result, upwardly extending members 142 and 146 include inclined portions 142a and 146a that are rotated relative to respective axes A1 and A2, and upwardly extending members 150 and 154 include inclined portions 150a and 154a that are rotated relative to respective axes A3 and A4.

FIG. 4 shows a pair of rotatable members 106 when their respective shank portions 118 extend through corresponding first and second mounting openings 130 and 134 in locking member 110, through mounting openings 102 in disk brake rotor 50, and screw into threaded openings 86 in disk mounting portion 78 of front hub 54. When the illustrated pair of rotating members 106 are in the mounting positions shown, the straight flat side edges of upwardly extending members 142 and 150 incline along and against the flat sides 119 of rotating members 106, whereas upwardly extending members 146 and 154 are pressed down by the rounded corners 120 of rotating members 106. If hex-head rotating members were used, then the straight flat side edges of upwardly extending members 142 and 146 would incline along and against opposite flat sides of the hex head of the corresponding rotating member that would extend through first mounting opening 130, and the straight flat side edges of upwardly extending members 150 and 154 would incline along and against opposite flat sides of the hex head of the corresponding rotating member that would extend through second mounting opening 134. Of course, upwardly extending members 142, 146, 150 and 154 could be relocated so that the straight flat edges thereof simultaneously abut against two sides of the triangular head of their corresponding rotating members 106.

It should be readily apparent from FIG. 4 that upwardly extending members 142, 146, 150 and 154 in this embodiment are positioned to selectively contact side surfaces 119 of head portions 114 of rotatable members 106 and to extend non-parallel (e.g., substantially or exactly perpendicular) to the contacted side surfaces 119 when rotatable members 106 are in their mounting positions in first and second mounting openings 130 and 134. It also should be readily apparent from FIG. 4 that at least one of junctions 158 and 162 between first surface 122 of locking member 110 and upwardly extending members 142 and 146 extends along its corresponding axis A1 or A2 that is non-parallel (e.g., substantially or exactly perpendicular) to the contacted side surface 119 of rotatable member 106 that extends through first mounting opening 130, and at least one of junctions 166 and 170 between first surface 122 of locking member 110 and upwardly extending members 150 and 154 extend along its corresponding axis A3 or A4 that is non-parallel (e.g., substantially or exactly perpendicular) to the contacted side surface of rotatable member 106 that extends through second mounting opening 134. Because upwardly extending members 142, 146, 150 and 154 extend elastically from first surface 122, upwardly extending members 142, 146, 150 and 154 can be pushed downwardly to move away from the contacted side surfaces 119 of head portions 114 of rotatable members 106 to disengage from the contacted side surfaces 119 and automatically return to contact the side surfaces 119. As a result, rotatable members 106 can be removed from hub 54 and later reinstalled.

Figure 5:
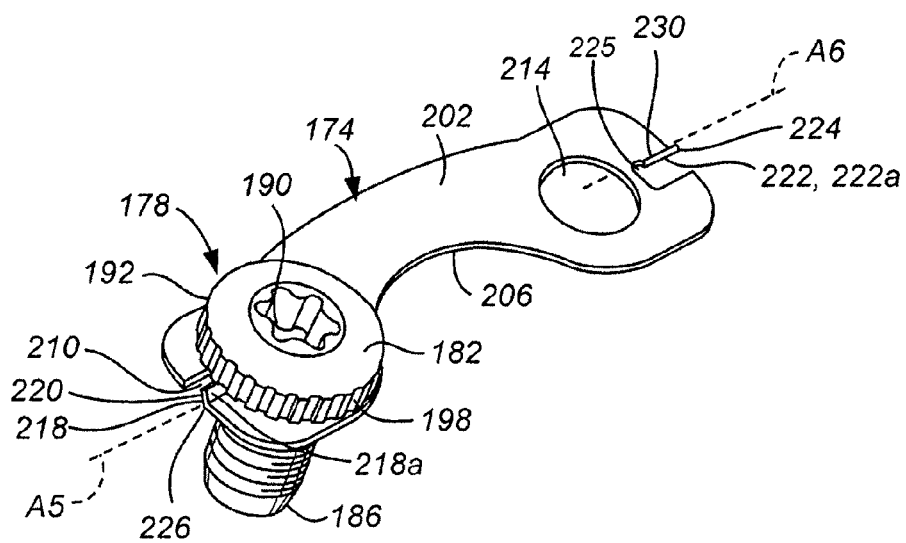
FIG. 5 is an upper perspective view of another embodiment of a locking member and a rotatable member.
Figure 6:
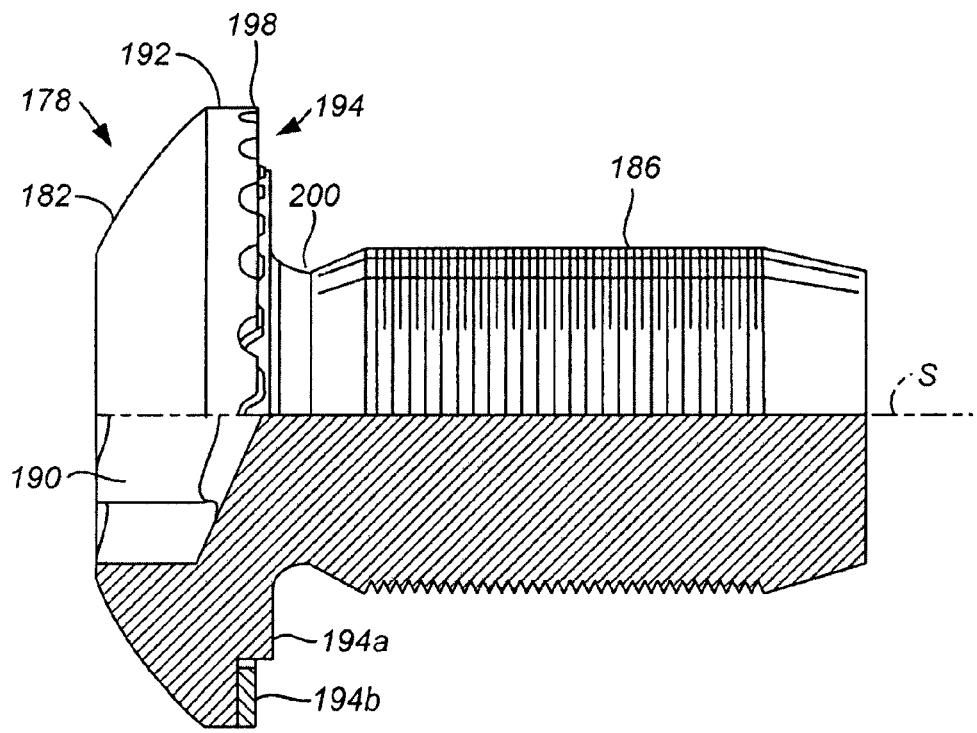
FIG. 6 is a partial cross-sectional view of the rotatable member.
Figure 7:
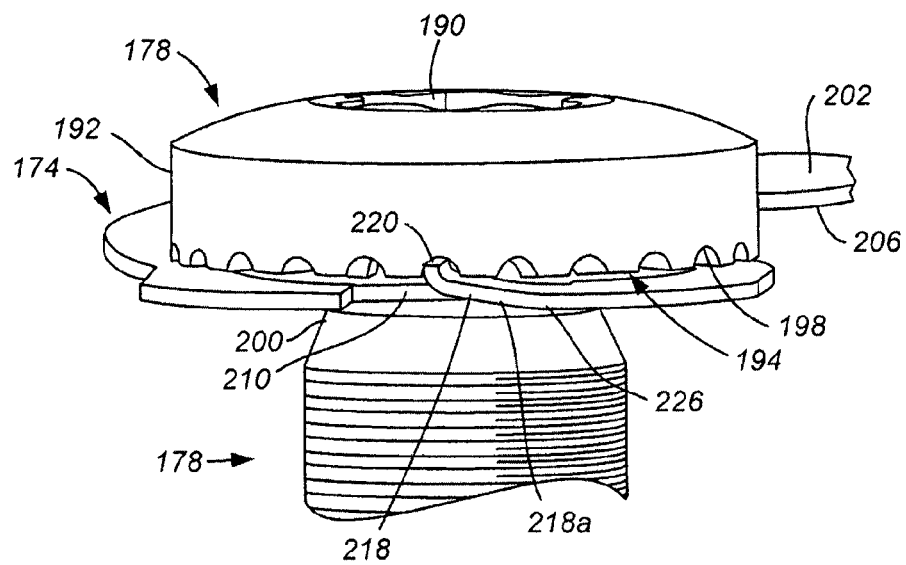
FIG. 7 is a detailed side view of the locking member and the rotatable member in a mounting position.

FIG. 5 is an upper perspective view of another embodiment of a locking member 174 and a rotatable member 178, FIG. 6 is a partial cross-sectional view of rotatable member 178, and FIG. 7 is a detailed side view of locking member 174 and rotatable member 178 in a mounting position. As shown in FIG. 6, rotatable member 178 comprises a head portion 182 and a threaded shank portion 186. Head potion 182 includes a tool-engaging opening 190 in the form of a star-shaped recess, a side surface 192 and a bottom surface 194. Bottom surface 194 includes a first bottom surface portion 194a and a second bottom surface portion 194b, wherein first bottom surface portion 194a and second bottom surface portion 194b form a step such that second bottom surface portion 194b is disposed further away from shank portion 186 along a shank axis S than first bottom surface portion 194a. A plurality of abutments in the form of ratchet teeth 198 are disposed circumferentially around second bottom surface portion 194b. A circumferential recess 200 is formed at the junction between head portion 182 and shank portion 186 for reasons discussed below.

As shown in FIGS. 5 and 7, as in the first embodiment, locking member 174 comprises a thin stamped metal plate that includes an upper first surface 202, a lower second surface 206 opposite first surface 202, a first mounting opening 210 and a second mounting opening 214, wherein first mounting opening 210 and second mounting opening 214 are dimensioned and positioned to align with a corresponding pair of threaded openings 86 in disk mounting portion 78 of front hub 54. Each first mounting opening 210 and second mounting opening 214 is dimensioned to receive shank portion 186 of a corresponding rotatable member 178 therethrough so that bottom surface 194 of head portion 182 of rotatable member 178 faces toward first surface 202.

A panel-shaped upwardly extending member 218 extends elastically upwardly at an incline from first surface 202 of locking member 174 in close proximity to first mounting opening 210 and terminates with a substantially vertically-oriented member in the form of a panel-shaped pawl tooth 220. Similarly, a panel-shaped upwardly extending member 222 extends elastically upwardly at an incline from first surface 202 in close proximity to second mounting opening 214 and terminates with a substantially vertically-oriented member in the form of a panel-shaped pawl tooth 224. An open-space clearance 221 (shown in FIG. 8) is formed in locking member 174 between first mounting opening 210 and upwardly extending member 218, and an open-space clearance 225 is formed in locking member 174 between second mounting opening 214 and upwardly extending member 222. Upwardly extending members 218 and 222 and their respective pawl teeth 220 and 224 are displaced sufficiently radially outwardly from first and second openings 210 and 214 so that first bottom surfaces 194a of rotatable members 178 contact first surface 202 of locking member 174. The stepped configuration of first bottom surface 194a and second bottom surface 194b ensures that upwardly extending members 218 and 222 do not interfere with the tightening of rotatable members 178 and are not flattened out when rotatable members 178 are disposed in their respective mounting positions.

In this embodiment, a junction 226 between first surface 202 of locking member 174 and upwardly extending member 218 extends along an axis A5 that extends radially outwardly from a location in first opening 210 along first surface 202. Similarly, a junction 230 between first surface 202 of locking member 174 and upwardly extending member 222 extends along an axis A6 that extends radially outwardly from a location in second opening 214 along first surface 202. As a result, an inclined portion 218a of upwardly extending member 218 is rotated relative to axis A5, and an inclined portion 222a of upwardly extending member 222 is rotated relative to axis A6. Axes A5 and A6 are slightly offset from the centers of first and second mounting openings 210 and 214, respectively, so that the top edges of pawl teeth 220 and 224 extend radially outwardly from first and second mounting openings 210 and 214 and are aligned with the centers of first and second mounting openings 210 and 214. As a result, when rotatable members 178 are disposed in their respective mounting positions in first and second mounting openings 210 and 214 (such as rotatable member 178 extending through mounting opening 210 in FIGS. 5 and 7), the ratchet teeth 198 on bottom surface 194b of each rotatable member 178 align and lock with the corresponding pawl teeth 220 and 224 on upwardly extending members 218 and 222.

In this embodiment, upwardly extending members 218 and 222 and their respective pawl teeth 220 and 224 are dimensioned to extend radially beyond side surfaces 192 of head portions 182 of their respective rotatable members 178 when rotatable members 178 are in their mounting positions. Since upwardly extending members 218 and 222 extend elastically from top surface 202 of locking member 174, upwardly extending members 218 and 222 can be selectively pushed downwardly to move pawl teeth 220 and 224 away from bottom surfaces 194b of rotatable members 178 to disengage pawl teeth 220 and 224 from ratchet teeth 198 and automatically return to contact bottom surface 194b. As a result, rotatable members 178 can be selectively removed from hub 54 and later reinstalled.

Figure 8:
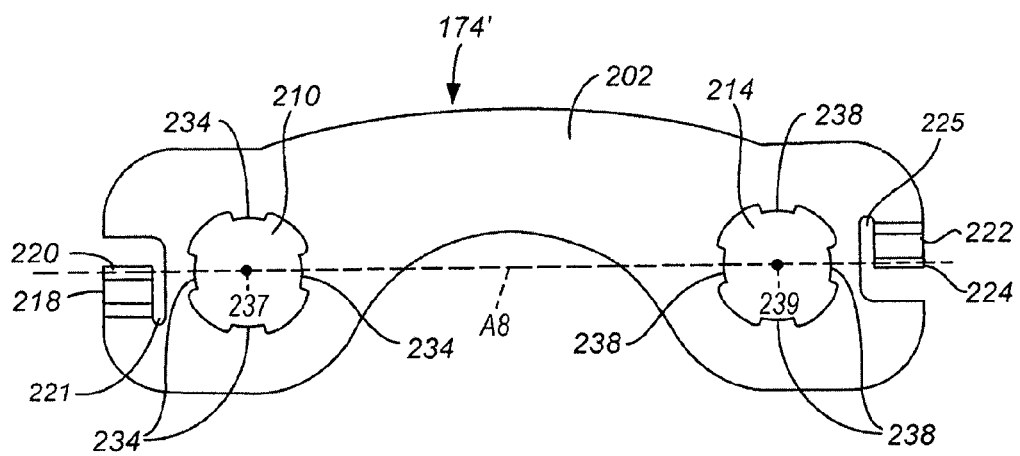
FIG. 8 is a top view of an alternative embodiment of a locking member.
Figure 9:
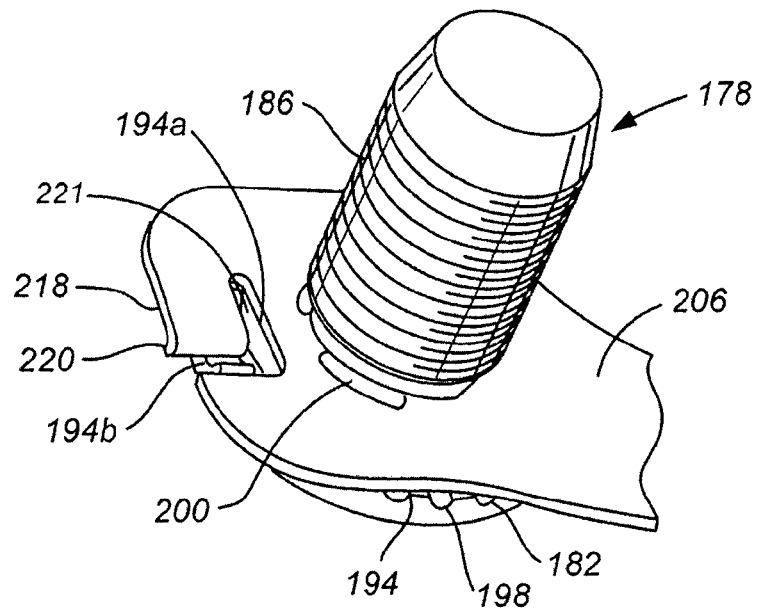
FIG. 9 is a lower perspective view of the locking member and the rotatable member in the mounting position.

FIG. 8 is a top view of an alternative embodiment of a locking member 174', and FIG. 9 is a lower perspective view of locking member 174' and a rotatable member 178 in the mounting position. Locking member 174' and rotatable member 178 have substantially the same structure as locking member 174 and rotatable member 178 in the previous embodiment, so components that are the same are numbered the same, and only the differences between the two embodiments will be discussed in detail. In this embodiment, locking member 174' includes a plurality of projecting portions 234 that extend into first mounting opening 210, wherein the plurality of projecting portions 234 extend into recess 200 of shank portion 186 of rotatable member 178 to engage shank portion 186 when rotatable member 178 is disposed in first mounting opening 210. Similarly, a plurality of projecting portions 238 extend into second mounting opening 214, wherein the plurality of projecting portions 238 extend into recess 200 of shank portion 186 of rotatable member 178 to engage shank portion 186 when rotatable member 178 is disposed in second mounting opening 214. Projecting portions 234 and 238 center shank portions 186 of rotating members 178 within their corresponding first and second mounting openings 210 and 214 to ensure that first bottom surfaces 194a of head portions 182 of rotating members 178 do not interfere with the engagement of pawl teeth 220 and 224 with ratchet teeth 198. Finally, extending member 218 aligns with both first and second mounting openings 210 and 214, and extending member 222 aligns with both first and second mounting openings 210 and 214. For example, in this embodiment, pawl tooth 220 of extending member 218 aligns with both first and second mounting openings 210 and 214, and pawl tooth 224 of extending member 222 aligns with both first and second mounting openings 210 and 214. Furthermore, in this embodiment, yawl teeth 220 and 224 align with an axis A8 that extends through first and second mounting openings 210 and 214, wherein an axis A8 intersects first and second centers 237 and 239 of first and second mounting openings 210 and 214, respectively.

Figure 10:
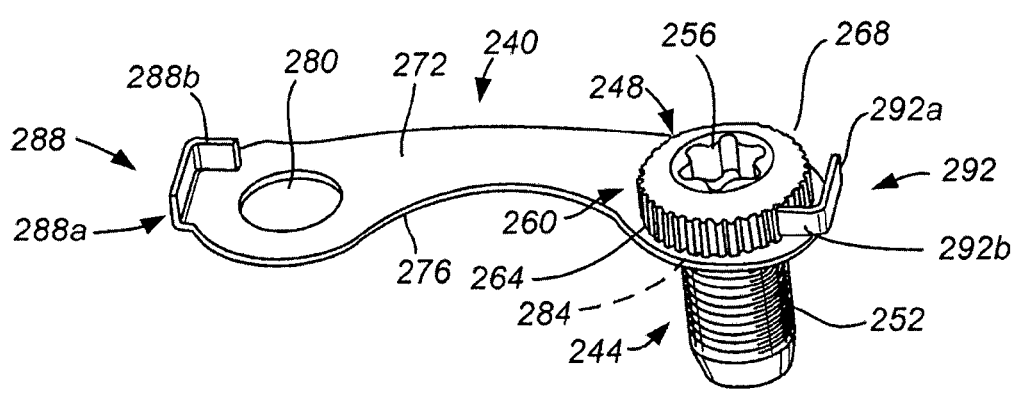
FIG. 10 is an upper perspective view of another embodiment of a locking member and a rotatable member in a mounting position.

FIG. 10 is an upper perspective view of another embodiment of a locking member 240 and a rotatable member 244 in a mounting position. As in the previous embodiments, rotatable member 244 comprises a head portion 248 and a threaded shank portion 252. Head portion 248 of rotatable member 244 includes a tool-engaging opening 256 in the form of a star-shaped recess, a side surface 260 and a bottom surface 264. A plurality of abutments in the form of ratchet teeth 268 are disposed circumferentially around side surface 260.

Locking member 240 has an upper first surface 272, a lower second surface 276 opposite first surface 272, a first mounting opening 280 and a second mounting opening 284, wherein each first mounting opening 280 and second mounting opening 284 is dimensioned to receive shank portion 252 of a corresponding rotatable member 244 therethrough so that bottom surface 264 of rotatable member 244 faces toward first surface 272 of locking member 240.

A first upwardly extending member 288 extends upwardly relative to first surface 272, wherein first upwardly extending member 288 is disposed in close proximity to first mounting opening 280. In this embodiment, first upwardly extending member 288 includes a panel-shaped first portion 288a and a panel-shaped second portion 288b. First portion 288a extends elastically vertically upwardly from the left edge of locking member 240, and second portion 288b extends elastically substantially orthogonally from first portion 288a towards first mounting opening 280 without contacting first surface 272. Similarly, a second upwardly extending member 292 extends upwardly relative to first surface 272, wherein second upwardly extending member 292 is disposed in close proximity to second mounting opening 284. Second upwardly extending member 292 includes a panel-shaped first portion 292a and a panel-shaped second portion 292b. First portion 292a extends elastically vertically upwardly from the right edge of locking member 240, and second portion 292b extends elastically substantially orthogonally from first portion 292a towards second mounting opening 284 without contacting first surface 272.

Second portions 288b and 292b of first upwardly extending member 288 and second upwardly extending member 292, respectively, are dimensioned and positioned to selectively contact the plurality of ratchet teeth 268 on the head portions 248 of corresponding rotatable members 244 in a non-parallel manner when rotatable members 244 are in their mounting positions in first and second mounting openings 280 and 284. Because of the elastic nature of first portions 288a, 292a and/or second portions 288b, 292b, second portions 288b and 292b elastically deflect when the corresponding rotatable member 244 rotates in a first direction and contact at least one of the plurality of ratchet teeth 268 to inhibit the corresponding rotatable member 244 from rotating in a second direction opposite the first direction. Furthermore, because of the elastic nature of first portions 288a, 292a and/or second portions 288b, 292b, second portions 288b and 292b can be can be pushed radially outwardly to move away from side surface 260 of head portion 248 of rotatable member 244 to disengage from ratchet teeth 268 and automatically return to contact ratchet teeth 268. As a result, rotatable members 244 can be selectively removed from hub 54 and later reinstalled.

While the above is a description of various embodiments of inventive features, further modifications may be employed without departing from the spirit and scope of the present invention. For example, the size, shape, location or orientation of the various components may be changed as desired. Components that are shown directly connected or contacting each other may have intermediate structures disposed between them. Separate components may be combined, and vice versa. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Terms of degree such as "substantially," "about" and "approximately" as used herein include a reasonable amount of deviation of the modified term such that the end result is not significantly changed. Thus, the scope of the invention should not be limited by the specific structures disclosed or the apparent initial focus or emphasis on a particular structure or feature.

What is claimed is:

1. An apparatus to assist mounting a disk brake rotor to a bicycle component that uses a rotatable member having a head portion attached to a shank portion, wherein the shank portion is adapted to extend into the bicycle component, wherein the apparatus comprises:
   a locking member having a first surface, a first mounting opening and a second mounting opening, wherein each first mounting opening and second mounting opening is dimensioned to receive the shank portion of a corresponding rotatable member therethrough so that a bottom surface of the head portion of the rotatable member faces toward the first surface of the locking member; and
   a first extending member that extends elastically relative to the first surface, wherein the first extending member is disposed in close proximity to the first mounting opening;
   wherein an open-space clearance is formed in the locking member between the first extending member and the first mounting opening when viewed perpendicular to the first surface;
   wherein, when the rotatable member is in a mounting position in the first mounting opening, the first extending member contacts the head portion of the rotatable member to inhibit the rotatable member from rotating in a first direction and extends radially beyond the bottom surface of the head portion of the rotatable member;
   wherein a most extensive free end tip of the first extending member contacts a bottom surface of the head portion of the rotatable member when the rotatable member is in the mounting position;
   wherein the free end tip of the first extending member aligns with the first mounting opening and the second mounting opening;
   wherein the first extending member deflects elastically when the rotatable member rotates in a second direction opposite the first direction, and
   wherein the first extending member remains elastic when the rotatable member is fastened to the locking member.

2. The apparatus according to claim 1 wherein the first extending member forms a panel.

3. The apparatus according to claim 1 wherein the first extending member is continuously one-piece with the locking member.

4. The apparatus according to claim 1 wherein a junction between the first surface of the locking member and an extending portion of the first extending member extends along an axis that extends radially outwardly from a location in the first opening.

5. The apparatus according to claim 4 wherein the axis extends radially outwardly from the center of the first opening.

6. The apparatus according to claim 1 wherein the first extending member includes an inclined portion in close proximity to the first opening, wherein the inclined portion is rotated relative to an axis that extends radially outwardly from a location in the first opening along the first surface of the locking member.

7. The apparatus according to claim 1 further comprising:
a second extending member that extends elastically relative to the first surface, wherein the second extending member is disposed in close proximity to the first mounting opening;
wherein, when the rotatable member is in a mounting position in the first mounting opening, the second extending member contacts the head portion of the rotatable member to inhibit the rotatable member from rotating in a first direction; and
wherein the second extending member elastically deflects when the rotatable member rotates in a second direction opposite the first direction.

8. The apparatus according to claim 1 wherein the rotatable member is a brake rotor fixing bolt.

9. The apparatus according to claim 1 further comprising:
a second extending member that extends elastically relative to the first surface, wherein the second extending member is disposed in close proximity to the second mounting opening, and wherein a most extensive free end tip of the second extending member aligns with the first mounting opening and the second mounting opening.

10. The apparatus according to claim 9 wherein the free end tip of the first extending member and the free end tip of the second extending member align with an axis that extends through the first mounting opening and the second mounting opening.

11. The apparatus according to claim 10 wherein the axis intersects first and second centers of the respective first and second mounting openings.

12. An apparatus to assist mounting a disk brake rotor to a bicycle component, wherein the apparatus comprises:
a rotatable member having a head portion attached to a shank portion, wherein the shank portion is adapted to extend into the bicycle component;
a locking member having a first surface, a first mounting opening and a second mounting opening, wherein each first mounting opening and second mounting opening is dimensioned to receive the shank portion of a corresponding rotatable member therethrough so that a bottom surface of the head portion of the rotatable member faces toward the first surface of the locking member; and
a first extending member that extends elastically relative to the first surface, wherein the first extending member is disposed in close proximity to the first mounting opening;
wherein an open-space clearance is formed in the locking member between the first extending member and the first mounting opening when viewed perpendicular to the first surface;
wherein a free end tip of the first extending member contacts the bottom surface of the head portion of the rotatable member to inhibit the rotatable member from rotating in a first direction;
wherein the free end tip of the first extending member aligns with the first mounting opening and the second mounting opening;
wherein the first extending member deflects elastically when the rotatable member rotates in a second direction opposite the first direction;
wherein the free end tip of the first extending member extends radially beyond the bottom surface of the head portion of the rotatable member when the rotatable member is fastened to the locking member; and wherein the first extending member remains elastic when the rotatable member is fastened to the locking member.

13. The apparatus according to claim 12 wherein the bottom surface of the head portion of the rotatable member includes a recess that forms an abutment.

14. The apparatus according to claim 13 wherein the first extending member forms a panel that has the free end tip for contacting the abutment to prevent the rotatable member from rotating in the first direction.

15. The apparatus according to claim 12 wherein a ratchet tooth is formed on the bottom surface of the head portion of the rotatable member, and wherein the first extending member elastically contacts the ratchet tooth.

16. The apparatus according to claim 12 wherein the rotatable member is a disk brake rotor fixing bolt.

17. An apparatus to assist mounting a disk brake rotor to a bicycle component, wherein the apparatus comprises:
a rotatable member having a head portion attached to a shank portion, wherein the shank portion is adapted to extend into the bicycle component;
a locking member having a first surface, a first mounting opening and a second mounting opening, wherein each first mounting opening and second mounting opening is dimensioned to receive the shank portion of a corresponding rotatable member therethrough so that a bottom surface of the head portion of the rotatable member faces toward the first surface of the locking member; and
a first extending member that extends elastically relative to the first surface, wherein the first extending member is disposed in close proximity to the first mounting opening;
wherein the first extending member comprises a first portion and a second portion, wherein the first portion extends upwardly from the first surface, and wherein the second portion extends from the first portion;
wherein the second portion of the first extending member overlaps the first surface of the locking member when viewed perpendicular to the first surface;
wherein the first extending member contacts the head portion of the rotatable member to inhibit the rotatable member from rotating in a first direction;
wherein the first extending member deflects elastically when the rotatable member rotates in a second direction opposite the first direction;
wherein the first extending member extends radially beyond the bottom surface of the head portion of the rotatable member when the rotatable member is fastened to the locking member;
wherein the first extending member remains elastic when the rotatable member is fastened to the locking member;
wherein a ratchet tooth is formed on a side surface of the head portion of the rotatable member, and wherein the second portion of the first extending member is biased elastically radially inwardly to contact the ratchet tooth;
wherein the second portion of the first extending member extends directly from the first portion of the first extending member towards the head portion of the rotatable member;
wherein the second portion of the first extending member that contacts the ratchet tooth has the shape of a plane that is oriented at least partially vertically; and wherein the upper edge of the plane terminates the second portion and forms an upper free edge of the first extending member.

\* \* \* \* \*